(12) United States Patent
Chen

(10) Patent No.: US 9,017,097 B2
(45) Date of Patent: Apr. 28, 2015

(54) DATA LINE

(75) Inventor: Shuan Chen, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/988,131

(22) PCT Filed: Apr. 12, 2011

(86) PCT No.: PCT/CN2011/072687
§ 371 (c)(1),
(2), (4) Date: May 17, 2013

(87) PCT Pub. No.: WO2012/119334
PCT Pub. Date: Sep. 13, 2012

(65) Prior Publication Data
US 2014/0024248 A1   Jan. 23, 2014

(30) Foreign Application Priority Data

Mar. 7, 2011   (CN) .................... 2011 2 0057551 U

(51) Int. Cl.
*H01R 13/66* (2006.01)
*H01R 13/46* (2006.01)
*H01R 31/06* (2006.01)
*G06F 13/38* (2006.01)

(52) U.S. Cl.
CPC ............. *H01R 13/46* (2013.01); *H01R 31/06* (2013.01); *G06F 13/38* (2013.01)

(58) Field of Classification Search
CPC ....................................................... H01R 13/60
USPC ........................................ 439/528, 131, 37
See application file for complete search history.

(56) References Cited

U.S. PATENT DOCUMENTS

| | | | | |
|---|---|---|---|---|
| 5,004,425 | A * | 4/1991 | Hee | 439/37 |
| 7,300,306 | B2 * | 11/2007 | Le et al. | 439/502 |
| 7,345,954 | B2 * | 3/2008 | Ehrsam et al. | 368/10 |
| 2009/0111286 | A1 * | 4/2009 | Giovannoni | 439/37 |

FOREIGN PATENT DOCUMENTS

| | | |
|---|---|---|
| CN | 201130796 Y | 10/2008 |
| CN | 201196983 Y | 2/2009 |

OTHER PUBLICATIONS

"Mediabridge Hi-Speed USB 2.0 Extension Cable—A-Male to A-Female—sold" in amazon.com.*
International Search Report for International Application No. PCT/CN2011/072687 mailed Oct. 13, 2011.

* cited by examiner

*Primary Examiner* — Phuong Dinh
(74) *Attorney, Agent, or Firm* — Pearl Cohen Zedek Latzer Baratz LLP

(57) ABSTRACT

Disclosed in the present disclosure is a data line, with two ends of the data line being provided with a first interface and a second interface respectively, and the first interface and the second interface being used for connecting to devices, wherein at least one end of the data line is provided with a first connection apparatus, with the first connection apparatus being connected to the other end of the data line or a second connection apparatus provided at the other end of the data line, so that the data line forms a circular shape by way of the connection of the first connection apparatus. By way of the present disclosure, the problem in the related art that is inconvenient to carry the data line is solved, so that the user experience is improved.

11 Claims, 2 Drawing Sheets

DATA LINE

CROSS-REFERENCE TO RELATED APPLICATIONS

This application is a National Phase Application of PCT International Application No. PCT/CN2011/072687, International Filing Date Apr. 12, 2011, claiming priority of Chinese Patent Application No. 201120057551.3, filed Mar. 7, 2011, which is hereby incorporated by reference.

FIELD OF THE DISCLOSURE

The present disclosure relates to a data line.

BACKGROUND OF THE DISCLOSURE

With the increasing of the terminal devices on the market, a data line is also widely applied, for example, the data line may be used to charge the terminal and used for data transmission and so on. The data line has become an indispensable accessory of the terminal. However, currently it is inconvenient to carry the data line. And, there is no product in the related art that aims to improve the convenience of carrying the data line.

SUMMARY OF THE DISCLOSURE

The disclosure provides a data line to solve the problem as mentioned above.

A data line is provided according to one aspect of the present disclosure.

The data line, with two ends of the data line being provided with a first interface and a second interface respectively, and the first interface and the second interface being used for connecting to devices, wherein at least one end of the data line is provided with a first connection apparatus, with the first connection apparatus being connected to the other end of the data line or a second connection apparatus provided at the other end of the data line, so that the data line forms a circular shape by way of the connection of the first connection apparatus.

Preferably, one end of the data line is provided with the first connection apparatus, and the other end of the data line is provided with the second connection apparatus, and the first connection apparatus is connected to the second connection apparatus so that the data line forms the circular shape by way of the connection between the first connection apparatus and the second connection apparatus.

Preferably, interior of the first connection apparatus is hollow, the first interface is provided inside the first connection apparatus, and the first interface or the first connection apparatus is slidable so that the first interface is at a position extending from the first connection apparatus or at a position retracting into the first connection apparatus; interior of the second connection apparatus is hollow, the second interface is provided inside the second connection apparatus, and the second interface or the second connection apparatus is slidable so that the second interface is at a position extending from the second connection apparatus or at a position retracting into the second connection apparatus; and the first connection apparatus is connected to the second connection apparatus when the first interface and the second interface are at the retraction position.

Preferably, the first connection apparatus comprises a projection, the second connection apparatus comprises a recess, and the fitting of the recess and the projection enable the first connection apparatus and the second connection apparatus to connect with each other.

Preferably, the projection is provided with a groove or a protrusion, in the situation where the projection is provided with the groove, the recess is provided with a protrusion, and in the situation where the projection is provided with the protrusion, the recess is provided with a groove, and the groove and the protrusion mate to snap-fit the projection and the recess.

Preferably, the first connection apparatus is fixed at one end of the data line, the first interface is connected to a first sliding axis which slides along a fixed slide track so that the first interface slides between the position extending from the first connection apparatus and the position retracting into the first connection apparatus, and/or the second connection apparatus is fixed at the other end of the data line, the second interface is connected to a second sliding axis which slides along a fixed slide track so that the second interface slides between the position extending from the second connection apparatus and the position retracting into the second connection apparatus.

Preferably, the line portion of the data line is provided in a belt structure, with the belt structure being flexible; and the shapes of the first connection apparatus and the second connection apparatus are the same as the cross section of the belt structure.

Preferably, the material of the belt structure is silica gel.

Preferably, the first connection apparatus and/or the second connection apparatus comprise(s) a circular ring with an opening.

Preferably, the first connection apparatus comprises a screw, and the second connection apparatus comprises a screw nut.

From the technical solution provided in the disclosure, with two ends of the data line are provided with a first interface and a second interface respectively, and the first interface and the second interface being used for connecting to devices, wherein at least one end of the data line is provided with a connection apparatus, with the connection apparatus being connected to the other end of the data line or a connection apparatus provided at the other end of the data line, so that the data line forms a circular shape by way of the connection of the connection apparatus. Through the disclosure, the problem in the related art that it is inconvenient to carry the data line is solved, so that the user experience is improved.

BRIEF DESCRIPTION OF THE DRAWINGS

Drawings, provided for further understanding of the present disclosure and forming a part of the specification, are used to explain the present disclosure together with embodiments of the present disclosure rather than to limit the present disclosure, wherein.

DETAILED DESCRIPTION OF THE EMBODIMENTS

Figure 1:
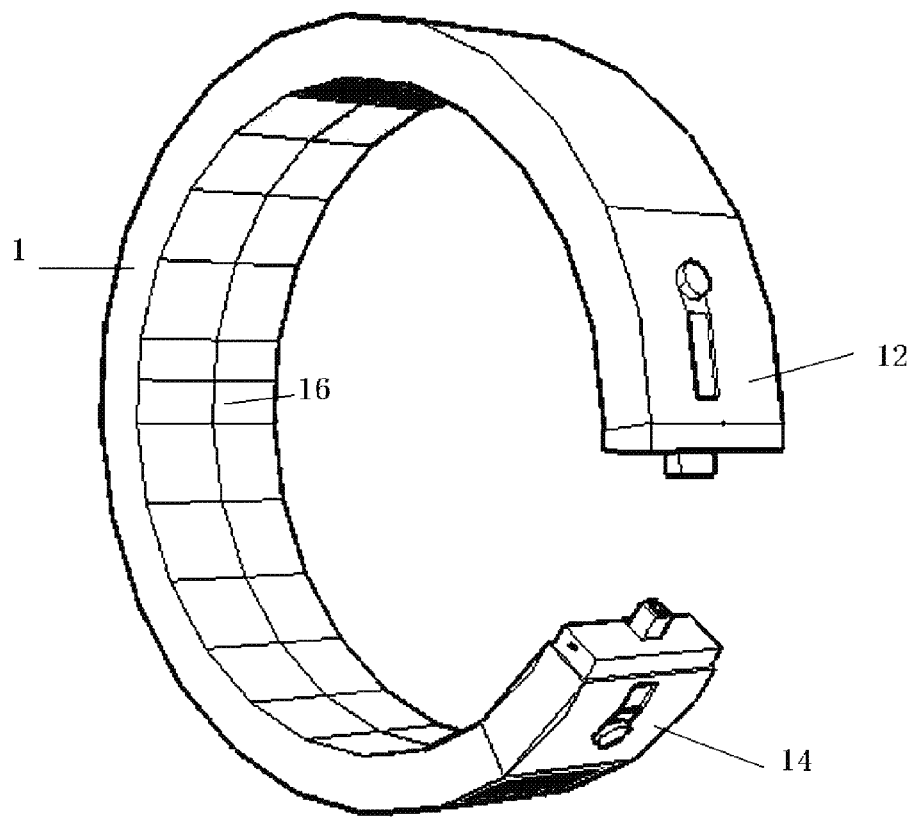
FIG. 1 is a schematic diagram of a loop data line according to the embodiments of the present disclosure.

A detailed description is given to the preferred embodiments of the disclosure with reference to the accompanying drawings. The preferred embodiments of the present disclosure are described for the purpose of illustration, not for limiting the present disclosure.

A data line is taken as an accessory of a terminal in the following embodiments, such as the data line of the mobile phone. The two ends of the data line are provided with a first interface and a second interface respectively, with the two interfaces being used for connecting to the other devices (such as computer, power, etc.), and currently, usually a USB interface and another interface (this interface is related to the function of the data line or related to the interface used by the terminal adapted by the data line) are used. In this embodiment, at least one end of the data line is provided with a connection apparatus, wherein one end of the data line may be provided with a connection apparatus, and no change is made to the other end, and the other end is connected via the connection apparatus, or, connection apparatus may be both provided at two ends, and the connection is done via these two connection apparatus. Whether one connection apparatus is provided or two connection apparatus are provided, the data line may form a circular shape by way of the connection of the connection apparatus.

By way of this embodiment, the data line may form a circular shape, so that it can be carried by body parts such as wrist, neck, etc., conveniently. In addition, for the sake of beauty, the color of the data line and that of the interface may be made brighter. Hereinafter, the connection apparatus of this data line will be described by way of examples.

For example, since the cross section area of the interface of the data line is usually larger than that of the line of the connection interface, one end of the data line may be provided with an openable circular ring, with the diameter of the circular ring being slightly larger than that of the line, so that the circular ring may be covered on the other end via this openable part of the circular ring, and since the interface is relatively large and the circular ring cannot fall off via this interface, the data line forms a circular shape. Of course, an openable circular ring may be provided at either end of this data line, and the data line forms a circular shape via the interconnection of these two circular rings, or a screw may be provided at one end of the data line and a screw nut is provided at the other end, and the data line forms a circular shape via the connection of the screw and the screw nut.

The implementation of the above connection manner is relatively simple and the cost thereof is low, however, it is not artistic enough. Another manner is provided in this embodiment, which is more artistic although more complex than the above manner and may bring better experience to the user. For the sake of easy description, the connection apparatus provided at one end of the data line is referred to as a first connection apparatus, and the connection apparatus provided at the other end of the data line is referred to as a second connection apparatus.

The interior of the first connection apparatus is hollow, the first interface is provided inside the first connection apparatus, and the first interface or the first connection apparatus is slidable so that the first interface is at a position extending from the first connection apparatus or at a position retracting into the first connection apparatus; The processing manner of the second interface and the second connection apparatus is the same as that of the first interface and the first connection apparatus, i.e. the interior of the second connection apparatus is hollow, the second interface is provided inside the second connection apparatus, and the second interface or the second connection apparatus is slidable so that the second interface is at a position extending from the second connection apparatus or at a position retracting into the second connection apparatus; and the first connection apparatus is connected to the second connection apparatus when the first interface and the second interface are at the retraction position.

By way of such retractable processing manner, the interface may be hidden, so that it cannot be directly perceived that the ring carried by the user is a data line, enhancing visual aesthetic feeling. Of course, after the retractable design is used, the first connection apparatus and the second connection apparatus may include a circular ring with an open or include a screw and a screw nut, so that they may be connected to each other via the circular ring with an open or via the screw and the screw nut.

Another preferable implementation is also provided in this embodiment, wherein the first connection apparatus may include a projection, and the second connection apparatus may include a recess, with the recess and the projection mating to connect the first connection apparatus with the second connection apparatus. As compared to the ring formed by the data line using the circular ring or using the screw and the screw nut, such connection manner has integration effects. If the recess and projection connection manner is used, the recess may be elastic and the cross section area of the projection may be slightly larger than that of the recess, so that the projection and the recess may be snap fitted. Of course, the projection may also be provided with a groove or a protrusion, and when the projection is provided with a groove, the recess is provided with a protrusion, and when the projection is provided with a protrusion, the recess is provided with a groove, and the groove and the protrusion mate to snap-fit the projection and the recess.

Preferably, for facilitating the connection apparatus and the interface to slide, the first connection apparatus may be fixed at one end of the data line, the first interface is connected to a first slide axis which slides along a fixed slide track so that the first interface may slide between the position extending from the first connection apparatus and the position retracting into the first connection apparatus, and/or, the second connection apparatus may be fixed at the other end of the data line, the second interface is connected to a second slide axis which slides along a fixed slide track so that the second interface may slide between the position extending from the second connection apparatus and the position retracting into the second connection apparatus.

Preferably, for the sake of being more artistic, the line of the data line is provided in a strip structure which can bend, for example, the material of the strip structure may be silica gel; and the shapes of the first connection apparatus and the second connection apparatus are the same as the cross section of the strip structure.

Hereinafter, a preferred embodiment will be described, and a data line in this preferred embodiment is more artistic and may be carried by the wrist, and in this embodiment, a USB interface being connected to the charger/computer USB port is taken as an example for description.

Figure 2:
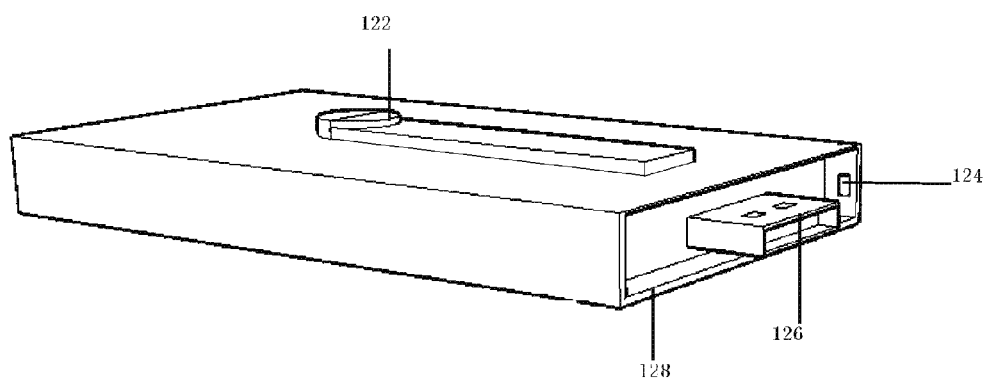
FIG. 2 is a schematic diagram of a first connection module 12 of the loop data line according to the embodiments of the present disclosure.
Figure 3:
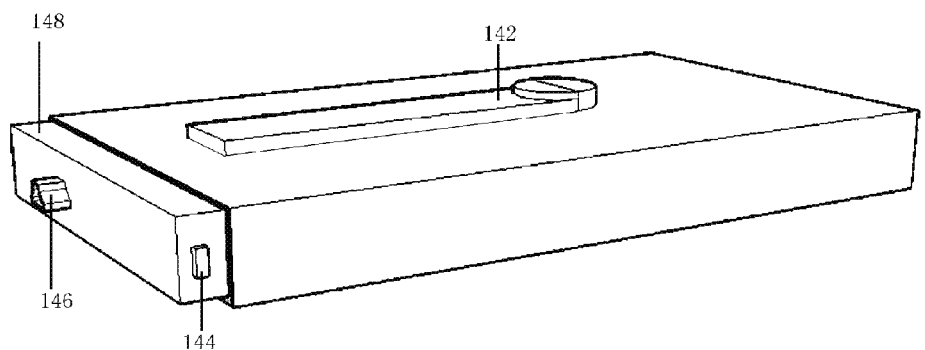
FIG. 3 is a schematic diagram of a second connection module 14 of the loop data line according to the embodiments of the present disclosure.

FIG. 1 is a schematic diagram of a loop data line according to the embodiments of the present disclosure, and as shown in FIG. 1, the data line 1 includes three parts: a first connection module (or referred to as first connection apparatus) 12, a second connection module 14, and a connection part 16. FIG. 2 is a schematic diagram of a first connection module 12 of a loop data line according to the embodiments of the present disclosure, and as shown in FIG. 2, the first connection module 12 includes a slide axis 122, a groove 124, a retractable USB interface 126 and a connection buckle 128. The interior of the first connection module 12 is hollow, the USB interface 126 is placed in the interior, the slide axis 122 placed at the top of the USB interface 126 and the USB interface 126 in the interior are fixed, the slide axis 122 can only carry out the slide operation via a fixed slide track, the metal line in the chain in the interior is connected to the USB interface 126 via a segment of flat cable, and the flat cable may be made of a foldable and durable material and may be hidden in the USB interface 126, with the length thereof being the same as the slide track at the top. FIG. 3 is a schematic diagram of a second connection module 14 of a loop data line according to the embodiments of the present disclosure, and as shown in FIG. 3, this second connection module 14 includes a slide axis 142, a protrusion 144, a retractable data interface 146 and a connection buckle 148, with the structure of the second connection module 14 being similar to that of the first connection module 12, which need not be described here. In order to embody the use effects, the first connection module 12 and the second connection module 14 may be encapsulated as a whole with hard silica gel material. The first connection module 12 and the second connection module 14 may be connected to each other via the connection buckles 128 and the connection buckles 148, wherein the connection buckle 128 is provided therein with the groove 124, the connection buckle 148 is provided with the protrusion 144, and the connection to the first connection modules 12 and the second connection modules 14 can be simply done by way of the mating of the groove 124 and protrusion 144.

Figure 4:
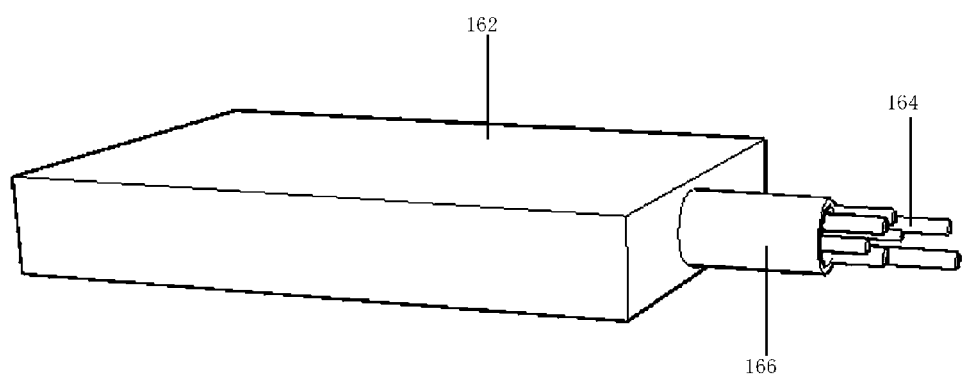
FIG. 4 is a schematic diagram of a connection part 16 of the loop data line according to the embodiments of the present disclosure.

As in this embodiment, the data line is carried by the wrist of the user, the entire external encapsulation material may be a firm and durable material with strong distorting and extensibility, and as shown in FIG. 4, the metal line 164 may be wrapped in the soft metal encapsulation layer 166, and then encapsulated as a whole using the silica gel material 162.

In summary, by way of the above embodiments, the portability of the data line product in the daily life of the user can be improved, and the user experience can be enhanced by changing the collocation of aspects such as appearance material, shape, color, etc.

The descriptions above are only the preferable embodiment of the present disclosure, which are not used to restrict the present disclosure. For those skilled in the art, the present disclosure may have various changes and variations. Any amendments, equivalent substitutions, improvements, etc. within the principle of the present disclosure are all included in the scope of the protection of the present disclosure.

What is claimed is:

1. A data line, with two ends of the data line being provided with a first interface and a second interface respectively, and the first interface and the second interface being used for connecting to devices, wherein
    one end of the data line is provided with the first connection apparatus, and the other end of the data line is provided with the second connection apparatus, and the first connection apparatus is connected to the second connection apparatus so that the data line forms a circular shape by way of the connection between the first connection apparatus and the second connection apparatus;
    wherein an interior of the first connection apparatus is hollow, the first interface is provided inside the first connection apparatus, and the first interface or the first connection apparatus is slidable so that the first interface is at a position extending from the first connection apparatus or at a position retracting into the first connection apparatus;
    wherein an interior of the second connection apparatus is hollow, the second interface is provided inside the second connection apparatus, and the second interface or the second connection apparatus is slidable so that the second interface is at a position extending from the second connection apparatus or at a position retracting into the second connection apparatus; and
    wherein the first connection apparatus is connected to the second connection apparatus when the first interface and the second interface are at the retraction position.

2. The data line according to claim 1, wherein
    the first connection apparatus comprises a projection, the second connection apparatus comprises a recess, and the fitting of the recess and the projection enable the first connection apparatus and the second connection apparatus to connect with each other.

3. The data line according to claim 2, wherein
    the projection is provided with a groove or a protrusion, in the situation where the projection is provided with the groove, the recess is provided with a protrusion, and in the situation where the projection is provided with the protrusion, the recess is provided with a groove, and the groove and the protrusion mate to snap-fit the projection and the recess.

4. The data line according to claim 1, wherein
    the first connection apparatus is fixed at one end of the data line, the first interface is connected to a first sliding axis which slides along a fixed slide track so that the first interface slides between the position extending from the first connection apparatus and the position retracting into the first connection apparatus, and/or
    the second connection apparatus is fixed at the other end of the data line, the second interface is connected to a second sliding axis which slides along a fixed slide track so that the second interface slides between the position extending from the second connection apparatus and the position retracting into the second connection apparatus.

5. The data line according to claim 1, wherein
    the line portion of the data line is provided in a belt structure, with the belt structure being flexible; and
    the shapes of the first connection apparatus and the second connection apparatus are the same as the cross section of the belt structure.

6. The data line according to claim 5, wherein the material of the belt structure is silica gel.

7. The data line according to claim 1, wherein the first connection apparatus and/or the second connection apparatus comprise(s) a circular ring with an opening.

8. The data line according to claim 2, wherein
    the first connection apparatus is fixed at one end of the data line, the first interface is connected to a first sliding axis which slides along a fixed slide track so that the first interface slides between the position extending from the first connection apparatus and the position retracting into the first connection apparatus, and/or
    the second connection apparatus is fixed at the other end of the data line, the second interface is connected to a second sliding axis which slides along a fixed slide track so that the second interface slides between the position extending from the second connection apparatus and the position retracting into the second connection apparatus.

9. The data line according to claim 3, wherein
    the first connection apparatus is fixed at one end of the data line, the first interface is connected to a first sliding axis which slides along a fixed slide track so that the first interface slides between the position extending from the first connection apparatus and the position retracting into the first connection apparatus, and/or the second connection apparatus is fixed at the other end of the data line, the second interface is connected to a second sliding axis which slides along a fixed slide track so that the second interface slides between the position extending from the second connection apparatus and the position retracting into the second connection apparatus.

10. The data line according to claim 2, wherein the line portion of the data line is provided in a belt structure, with the belt structure being flexible; and the shapes of the first connection apparatus and the second connection apparatus are the same as the cross section of the belt structure.

11. The data line according to claim 3, wherein the line portion of the data line is provided in a belt structure, with the belt structure being flexible; and the shapes of the first connection apparatus and the second connection apparatus are the same as the cross section of the belt structure.

\* \* \* \* \*